United States Patent
Barnes et al.

(10) Patent No.: US 7,624,910 B2
(45) Date of Patent: Dec. 1, 2009

(54) PERFORATED COMPOSITES FOR JOINING OF METALLIC AND COMPOSITE MATERIALS

(75) Inventors: John E. Barnes, Roswell, GA (US); Robert W. Koon, Acworth, GA (US); Robert J. Olliffe, Roswell, GA (US); Stephen P. Engelstad, Marrietta, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 106 days.

(21) Appl. No.: 11/279,970

(22) Filed: Apr. 17, 2006

(65) Prior Publication Data

US 2007/0241164 A1 Oct. 18, 2007

(51) Int. Cl.
*B23K 33/00* (2006.01)
*B23K 20/12* (2006.01)

(52) U.S. Cl. .................. 228/248.1; 228/248.5; 228/115; 228/112.1

(58) Field of Classification Search .............. 228/248.1, 228/248.5, 115, 112.1
See application file for complete search history.

(56) References Cited

U.S. PATENT DOCUMENTS

| | | | | |
|---|---|---|---|---|
| 2,966,423 A * | 12/1960 | Shichman | ................... | 427/449 |
| 6,048,670 A * | 4/2000 | Bosman et al. | ............. | 430/323 |
| 7,066,375 B2 * | 6/2006 | Bolser | ........................ | 228/114 |
| 7,105,205 B2 * | 9/2006 | Clayton et al. | .............. | 427/446 |
| 2003/0126800 A1 * | 7/2003 | Seth et al. | ...................... | 51/293 |
| 2004/0265503 A1 * | 12/2004 | Clayton et al. | .............. | 427/446 |
| 2005/0242158 A1 * | 11/2005 | Bolser | ..................... | 228/112.1 |
| 2006/0006157 A1 * | 1/2006 | Oldani | .................. | 219/121.64 |
| 2007/0194085 A1 * | 8/2007 | Spinella et al. | ............. | 228/101 |
| 2007/0297935 A1 * | 12/2007 | Langan et al. | ............... | 420/528 |
| 2008/0023527 A1 * | 1/2008 | Brenninger et al. | ......... | 228/101 |
| 2008/0041921 A1 * | 2/2008 | Creehan et al. | ............. | 228/101 |

\* cited by examiner

*Primary Examiner*—Kiley Stoner
*Assistant Examiner*—Erin B Saad
(74) *Attorney, Agent, or Firm*—Bracewell & Giuliani LLP

(57) ABSTRACT

Embodiments in the present invention provide a system and method of joining structural members. This method involves aligning the first structural member to a metallic substrate when the first structural member has at least one tapered hole or cavity. A metallic or other like material suitable to cold spraying technology is deposited into the tapered cavity to form a shaped or tapered fastener bonded to the metallic substrate. The shape of the fastener secures the first structural member to the metallic substrate. Additionally, a protective insert may be placed within the shaped or tapered cavity to protect the first structural member during hoe cold spraying deposition when the first structural member is a composite material or other like material susceptible to erosion during the cold spraying technique. After the material has been deposited using cold spray techniques this material may be further solidified and bonded to the metallic substrate using a technique such as friction stir welding in order to increase the load carrying capacity of the in-situ shaped fastener.

11 Claims, 13 Drawing Sheets

PERFORATED COMPOSITES FOR JOINING OF METALLIC AND COMPOSITE MATERIALS

TECHNICAL FIELD OF THE INVENTION

The present invention relates generally to structural joints and more particularly a method to join two or more members.

BACKGROUND OF THE INVENTION

Structural joints in aircraft applications frequently involve the joining of metallic and composite structures. These joints are accomplished using typical fastening concepts which suffer from significant strength reductions caused by the need to drill holes in the metallic member. This joining method also requires significant setup time in drilling holes and installing fasteners to attach the members to one another. Such holes often produce localized stresses and mechanical loads that the structure must account for. To account for such localized loads, the structures are typically reinforced resulting in increased weight and loads to be handled by the structure. Furthermore, quality assurance issues may arise when installing such fasteners (misdrilled holes and improper fastener installation is common).

Friction Stir Welding (FSW) is a newer joining method, as illustrated in FIG. 1 which has gained acceptance as a means for joining all metal panels together. FSW produces a plasticized region 22 of material by pushing a non-consumable rotating tool 24 into the material of parts 26A and 26B that are to be welded. Then a central pin, or probe, 28 followed by the shoulder 30, is brought into contact with the two parts 26A and 26B to be joined. The rotation of tool 24 heats up and plasticizes the materials that the tool is in contact with. As tool 24 moves along the joint line 32, material from the front of the tool is swept around this plasticized annulus to the rear, so eliminating the interface.

There are cost advantages if one applies a simple stiffened skin structure that may be produced via FSW to the exterior of a vehicle such as an aircraft. The robustness and automation of the process is very attractive for manufacturing. However, smaller complex three dimensional structures, such as aircraft designs, have not been easily addressed by the application of FSW. Furthermore, the FSW process works with metals as opposed to composite materials. The FSW process clamps two pieces that abut one another and then mixes the materials of the two pieces. This is most effectively achieved when two metallic pieces are forming a single two-dimensional surface. Thus it has been difficult to apply FSW processing to complex three-dimensional structures that involve both composites and metals.

Further limitations and disadvantages of conventional and traditional joining process and related structures and functionality will become apparent to one of ordinary skill in the art through comparison with the present invention described herein.

SUMMARY OF THE INVENTION

The present invention provides a means of joining a first structural member and a second structural member that substantially addresses the above identified needs as well as others.

Embodiments in the present invention provide a system and method of joining structural members. This method involves aligning the first structural member to a metallic substrate when the first structural member has at least one shaped or tapered cavity. A metallic or other like material suited to cold spraying technology is deposited into the tapered cavity to form a shaped or tapered fastener bonded to the metallic substrate. The shape of the fastener, which is determined by the shape of the cavity, secures the first structural member to the metallic substrate. Additionally, a protective insert may be placed within the shaped or tapered cavity to protect the first structural member during the cold spraying deposition. The first structural member may be a composite material or other like material susceptible to erosion during the cold spraying technique. After the material has been deposited using cold spray techniques this material may be further solidified and bonded to the metallic substrate using a technique such as friction stir welding in order to increase the load carrying capacity of the in-situ shaped fastener.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Embodiments of the present invention are illustrated in the FIGURES, like numerals being used to refer to like and corresponding parts of the various drawings.

Embodiments in the present invention provide a system and method of joining structural members. This method involves aligning the first structural member to a metallic substrate wherein the first structural member has at least one shaped or tapered cavity. A metallic or other like material suitable to be deposited using cold spraying technology is placed in the tapered cavity to form an in-situ shaped or tapered fastener that is bonded to the metallic substrate. Cold spray technology (also referred to as kinetic metallization) is a metal deposition process in which a powder alloy is entrained in a gas stream traveling at near supersonic speeds. The high speed impact of the powder particle upon a surface results in a high degree of deformation in the particle and leads to a combination metallurgical and mechanical bond.

The shape of the cold sprayed fastener secures the first structural member to the metallic substrate. Additionally, a protective insert may be placed within the shaped or tapered cavity to protect the first structural member during the cold spraying deposition when the first structural member is a composite material or other like material susceptible to erosion during the cold spraying technique. After the material has been deposited using cold spray techniques this material may be further solidified and bonded to the metallic substrate using a technique such as friction stir welding in order to increase the load carrying capacity of the in-situ shaped fastener.

Figure 1:
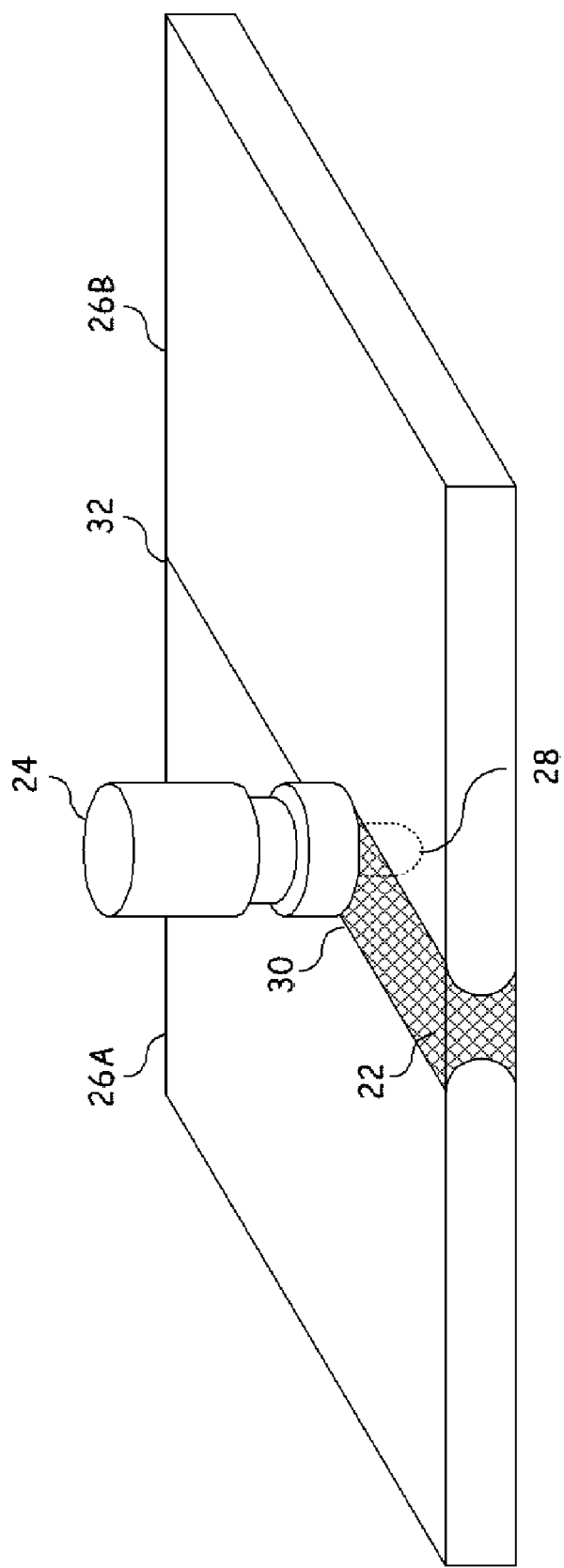
FIG. 1 illustrates the Friction Stir Welding (FSW) joining method.
Figure 2A:
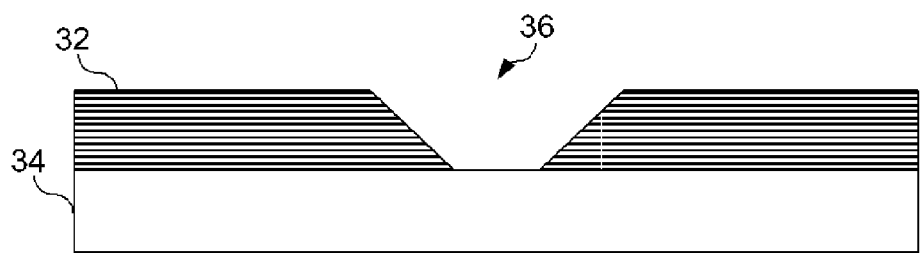
FIG. 2A through 2H provide a series of cross sectional drawings that illustrate a method of forming a in-situ shaped fastener that may be used to mechanically join a first structural member and a second structural member in accordance with an embodiment of the present invention.

FIG. 2A through 2H provide a series of cross sectional drawings that illustrate a method of forming a in-situ shaped fastener that may be used to mechanically join a first structural member and a second structural member. FIG. 2A depicts a first structural member such as a composite material 32 aligned to a second structural member such as a metallic substrate 34. Composite layer 32 may contain several shaped cavities or holes throughout the structure. These holes may be pre-drilled avoiding the cost of drilling composite materials once the part is in place. By eliminating the drilling of metallic members on the aircraft quality issues associated with the assembly of composite materials and fastener location may be reduced as well.

This composite material may include metallic components woven into or within the composite matrix. These metallic components may improve the joint by bonding to the material deposited during the cold spraying process. The use of composite and metallic parts often requires complex solutions to join metallic and composite components. This typically involves drilling holes and installing fasteners to attach the dissimilar materials. The time associated with setup, tooling and accuracy associated with placing these fasteners may become large quality assurance issues as well as time consuming portions of the manufacturing process.

Figure 2B:
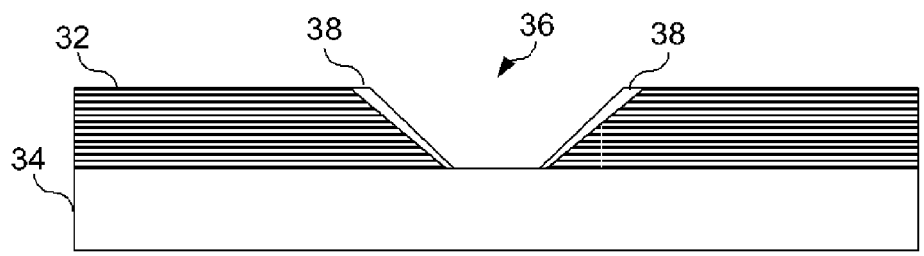

The composite layer 32 may be susceptible to erosion when subject to direct or indirect contact with a deposition technique such as cold spraying. To prevent erosion, a protective insert 38 as shown in FIG. 2B may be placed within the cavity. Additionally, a masking layer 40, depicted in FIG. 2C, may be placed on the external surface of the composite layer 32 to prevent surface erosion.

Figure 3:
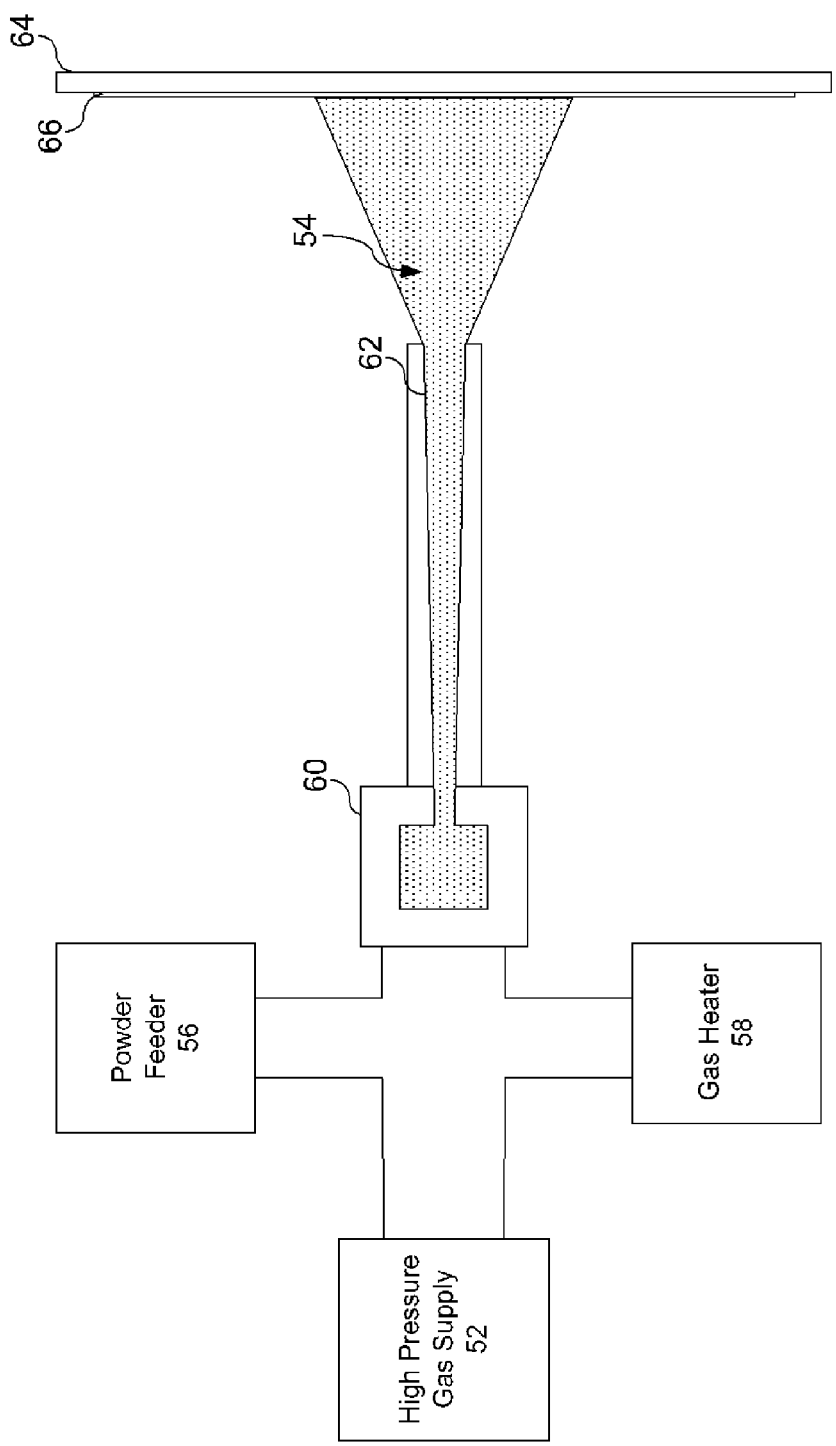
FIG. 3 provides a schematic diagram of cold spray process.

FIG. 3 provides a schematic diagram of cold spray process. In the cold spray process, energy stored in the high pressure compressed gas supply 52 is used to propel fine particles 54 supplied by a powder feeder 56 at high velocities. The compressed gas may be fed via heating unit 58 to gun 60 where the gas entrains particles 54 and exits through nozzle 62 at a high velocity. Powder particles 54 are accelerated to a certain velocity and heated to a desired temperature within gun 60. Upon impact with substrate 64 particles 54 are deformed and bond to substrate 64, thus forming coating 66. With this process a fine balance exist between particle size, density, temperature, and velocity in achieving a coding having a desired set of properties.

Cold spraying, unlike conventional thermal spray processes, does not require preheating of the sprayed materials so the particles are in a semi-molten state when the particles reach the substrate. Conventional thermal spray processes allow the particles to be splashed across the surface. As the 'splats' cool in conventional thermal spraying, the deformed particles contract slightly, creating residual stresses or flaws at the interface that can cause defects. By contrast, cold sprayed materials typically remain at, or near, room temperature until impact, slamming into the substrate so fast that a tight bond is formed without the undesirable chemical changes and stresses associated with conventional processes. Unlike thermal-sprayed materials, cold-sprayed materials experience little to no defect-causing oxidation during flight and exhibit remarkably high densities and conductivities once fabricated. In addition, deposition rates comparable to traditional thermal spray processes can be achieved.

The cold spraying process plastically deform the materials as the particles hit, which disrupts surface oxides and forces the metal into intimate contact with the underlying material. Thus, the process is suited to ductile materials. Non-ductile materials such as ceramics can not be sprayed alone, but can be applied using ceramic/metal composite powders. In this case the metal acts as a ductile matrix.

Unlike thermal spray techniques, heat input into the substrate from a flame or plasma is not a problem, so shorter stand off distances can be used. Typical stand-off distances range from about 1 cm to 5 cm. This allows the amount of required masking to be reduced or eliminated.

Substrates choice is limited by their ability to absorb the impact energy from the projected particles. Ceramics and metals are generally fine, but with plastics and composites particles become embedded in the substrate rather than forming a coating.

Figure 2C:
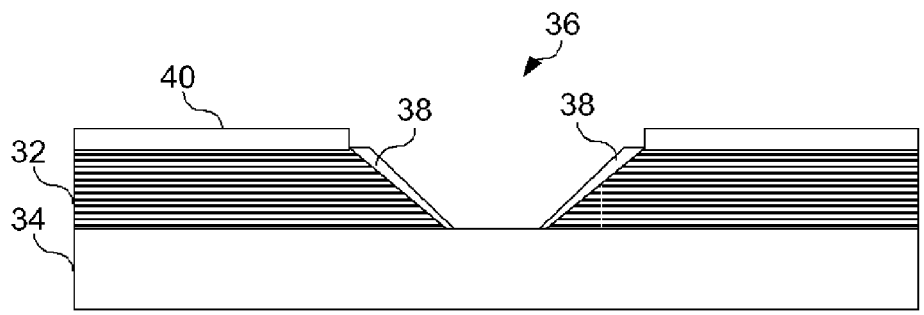

Returning to the series of cross-sectional diagrams provided in FIGS. 2A through 2H. FIG. 2B and 2C depict a protective insert 38 that may be placed on the inner walls of cavity 36. As shown here, cavity 36 is tapered. Steeper taper angles may result in increased mechanical properties of the in-situ fastener to be formed in the shaped cavity. Additionally to protect the upper surface of the composite layer 32 a masking layer 40, shown in FIG. 2C may be placed on the upper surface of composite layer 32 prior to initiating a cold-spraying process.

Figure 2D:
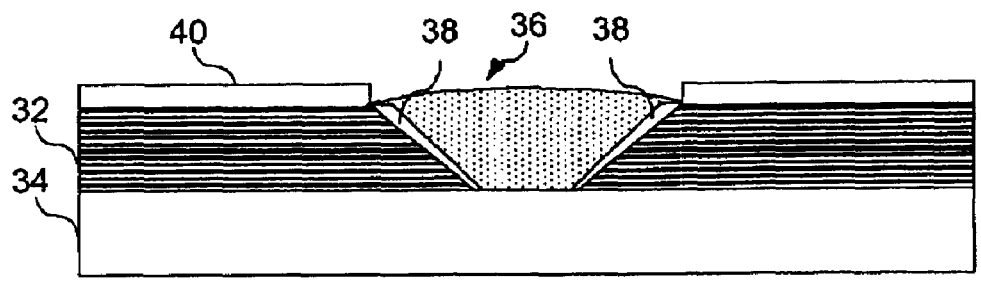
Figure 2E:
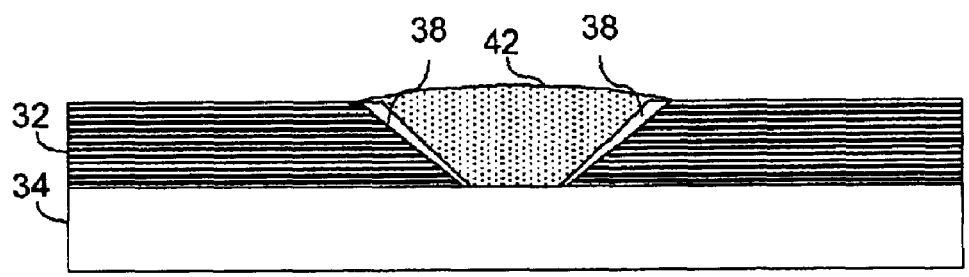
Figure 2F:
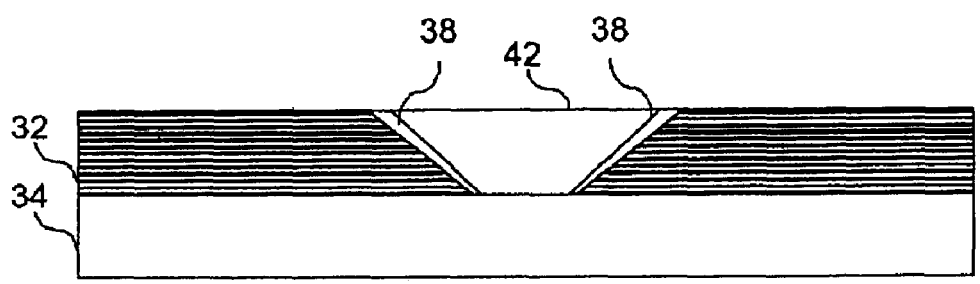

FIG. 2D shows the results of depositing a metallic material such as a mixture of aluminum (Al), zinc (Zn), and aluminum oxide ($Al_2O_3$) as a powder within shaped cavity 36. This results in a plug of material being built up that forms the in-situ fastener 42 two which is shown in FIG. 2D and 2E. In FIG. 2E the masking layer 40 has been removed so that the upper surface 48 of in-situ fastener 42 may be milled such that a smooth or flush continuous surface may be provided on the upper surface of composite layer 32. In FIG. 2F in-situ fastener 42, protective inserts 38 and metallic substrate 34 are bonded together. This bond is created by the plastic deformation of the material deposited using the cold-spraying technique. However this results in an in-situ fastener that has a mechanical strength less than that of a solid piece of the material used for deposition.

Figure 2G:
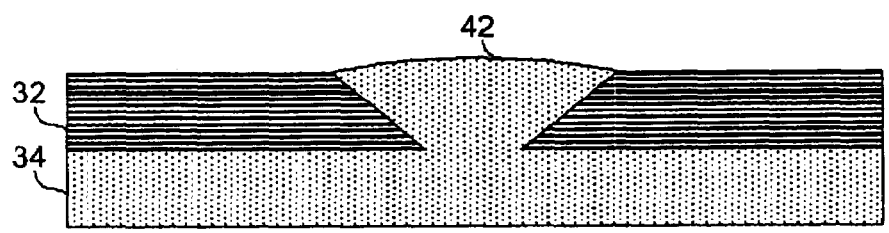
Figure 2H:
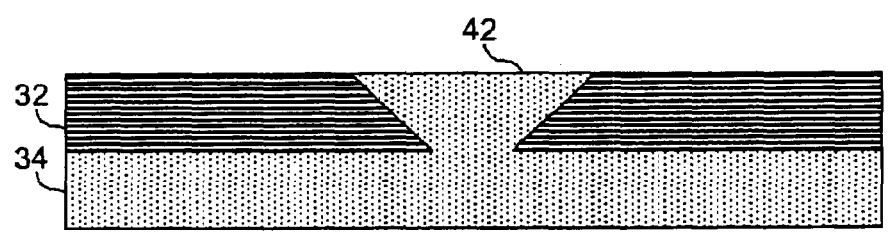

This weakness may be addressed by applying a friction stir well process that mixes the materials of protective insert 38, in-situ fastener 42 and substrate layer 34 to provide a continuous in-situ fastener that is bonded to the metallic substrate as shown in FIG. 2G. This in-situ fastener may again be milled in order to provide a flush smooth continuous surface as is shown in FIG. 2H.

Figure 4:
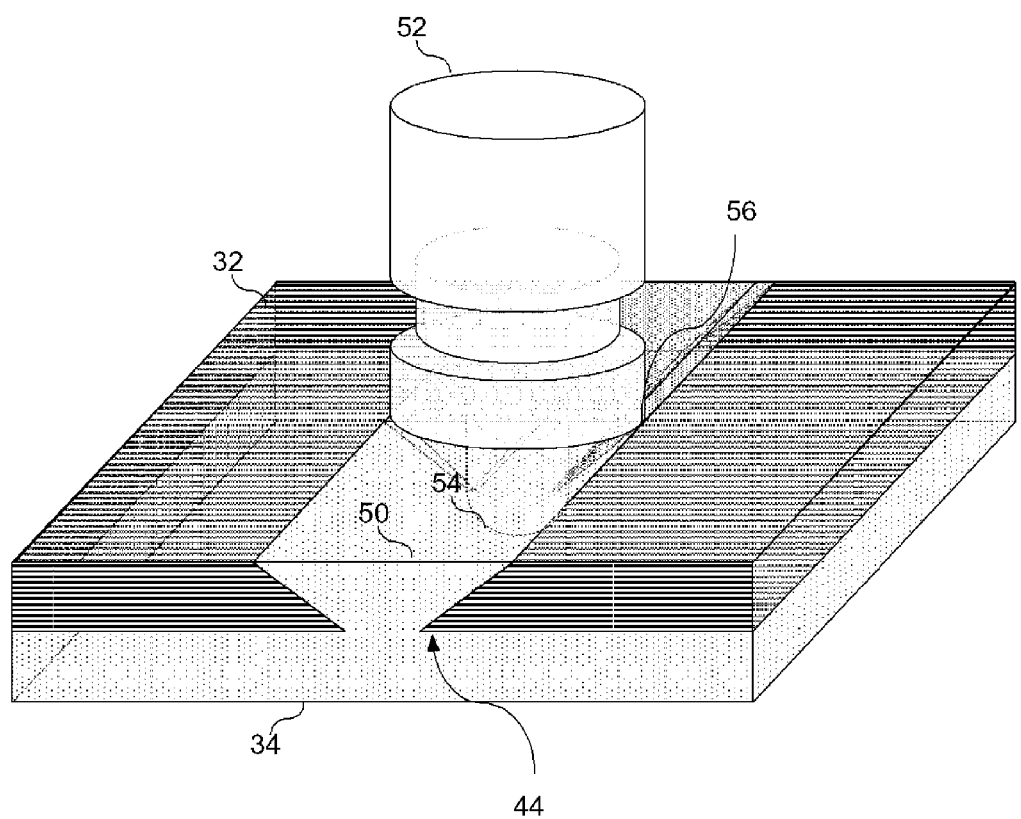
FIG. 4 provides an isometric view of two members such as composite layer and metallic substrate that have bonded using a tapered in-situ fastener that may run a predetermined length along the composite material.

FIG. 4 provides an isometric view of two members such as composite layer 32 and metallic substrate 34 that have bonded using a tapered in-situ fastener 50 that may run a predetermined length along the composite material. Here protective insert 38 and cold-sprayed material 42 may be deposited within a tapered or shaped channel 44 within the composite layer 32. This results in a continuous bonded in-situ fastener having a mechanical strength less than that of the metallic substrate. To address this, a rotating tool 52 may be used to insert a probe 54 into the channel and cold-sprayed deposited material. This probe extends into a portion of metallic substrate 34. Rotation of probe 52 and shoulder 56 will plasticize materials proximate to the shoulder and probe. These materials include both materials that have been deposited using the cold spray technique, the protective insert 38 (if applied), as well as metallic substrate 34. Additionally metallic material incorporated into the matrix of composite layer 32 may be plasticized as well to result in a further improvement of the bond between the metallic components and the composite layer.

Figure 5:
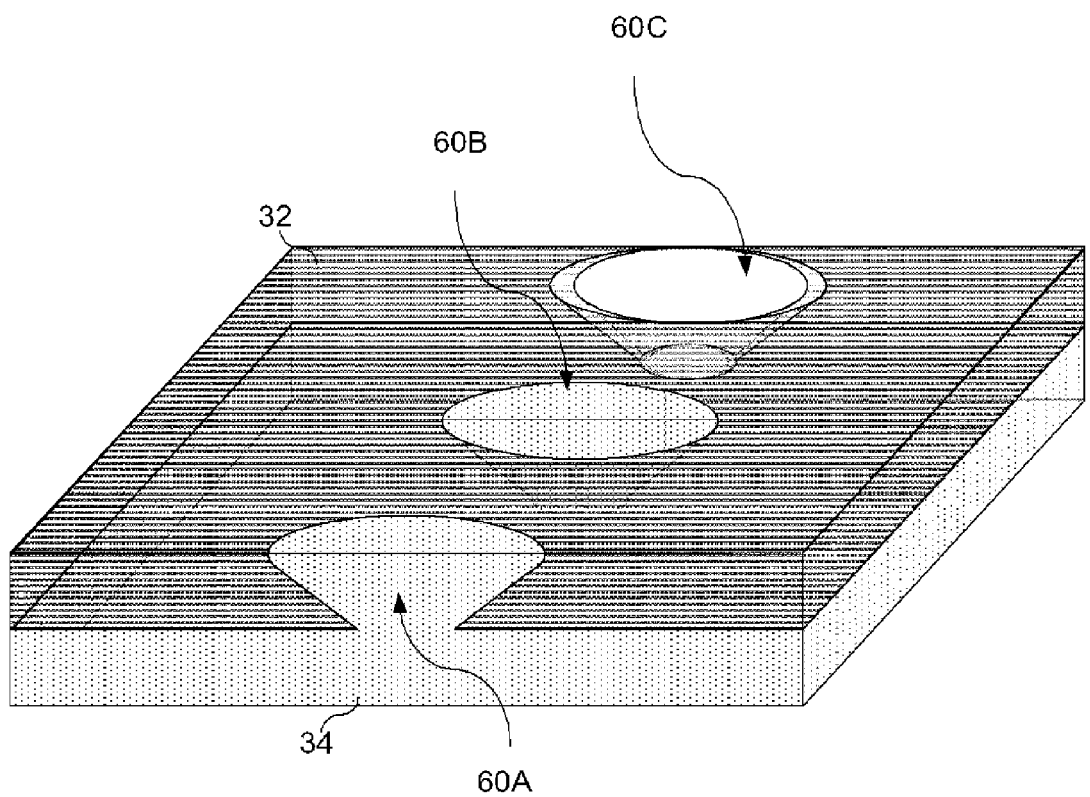
FIG. 5 shows a first structural member and a second structural member, initially fitted together by male connectors and female receptacles, and then permanently joined by a FSW to in accordance with an embodiment of the present invention.

FIG. 5 again shows a composite layer 32 mechanically secured to a metallic substrate 34 using in-situ fasteners. However unlike the elongated channel fastener depicted in FIG. 4 a series of discreet in-situ fasteners 60A, 60B and 60C that may be used to secure the composite layer 32 to metallic substrate 34. As shown here in-situ fastener 60A is shown having a cross-section where a friction stir-well process has been applied to mix and further bond the materials deposited using a cold spray technique within the tapered cavity to the metallic substrate 34. In-situ fastener 60B is shown within the composite material and again a friction stir-well process has been applied to this in-situ fastener. In-situ fastener 60C depicts a fastener wherein the friction stir-well process has not been applied to the cold-sprayed material deposited within the shaped cavity.

Figure 6A:
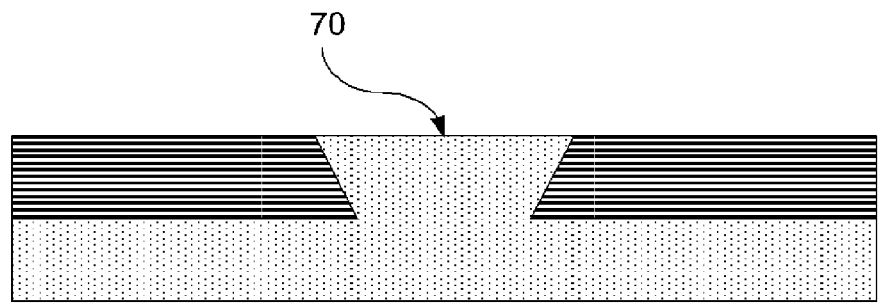
FIG. 6A through 6C show various embodiments of fastener cavity geometries in accordance with an embodiment of the present invention.
Figure 6B:
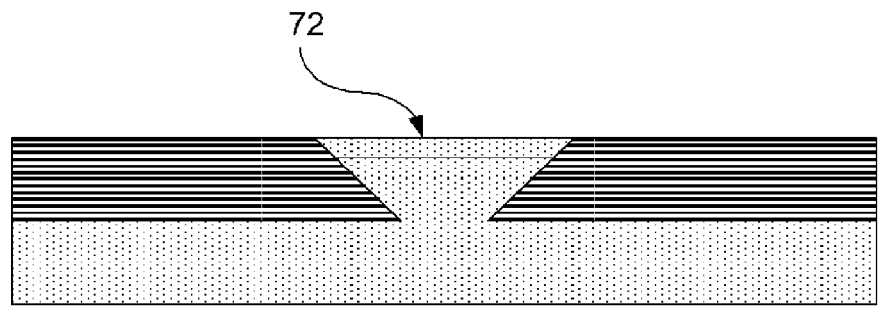
Figure 6C:
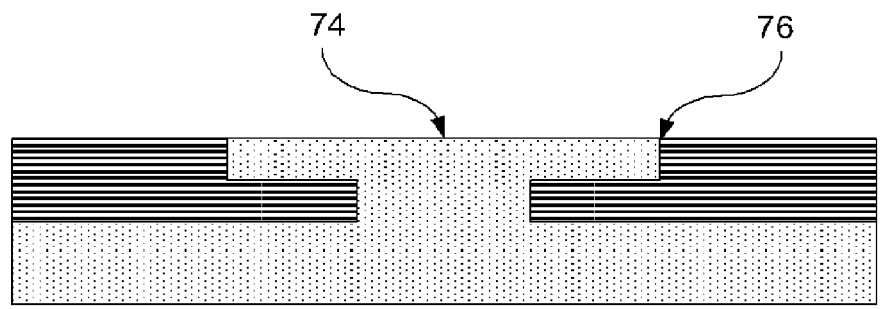

FIGS. 6A, 6B, and 6C show various embodiments of fastener cavity geometries. For example FIG. 6A shows a tapered cavity 70 within a composite material having a relatively small taper angle. While FIG. 6B shows a cavity 72 within a composite material having a much larger taper angle. FIG. 6C depicts a cavity 74 within a composite material where a flange 76 is formed. Some experimental data has shown that larger taper angles lead to higher quality joints. The hole diameter may not necessarily affect the deposition process in that softer alloys are more easily deposited and are less erosive to the composite material surrounding the shaped cavity. For example in one embodiment the material deposited using the cold-spray technique comprised aluminum powder that was comprised of powder that was 60 percent by weight aluminum (Al), 20 percent by weight zinc (Zn) and 20 percent by weight aluminum oxide ($Al_2O_3$).

Figure 7A:
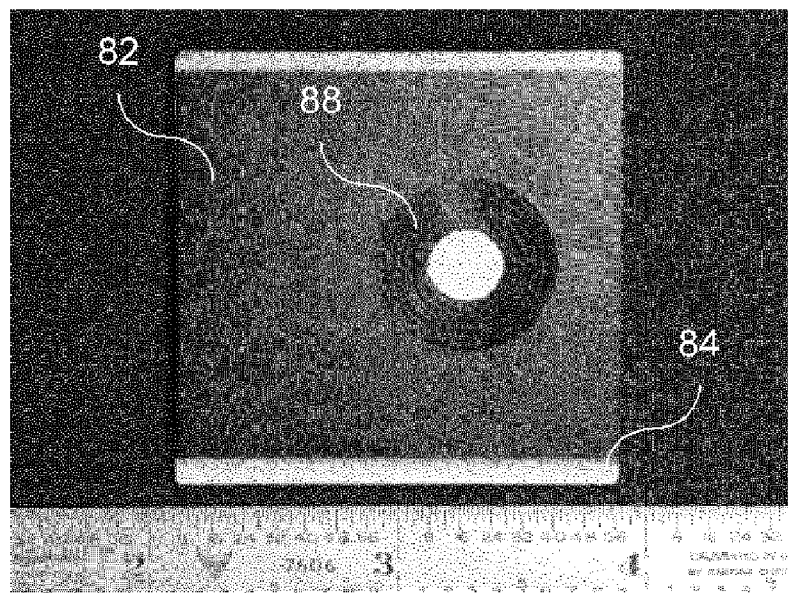
FIG. 7A through 7D provide actual top down photographs of a composite material placed on metallic substrate wherein an in-situ fastener is built up within the cavity 88 in accordance with an embodiment of the present invention.
Figure 7B:
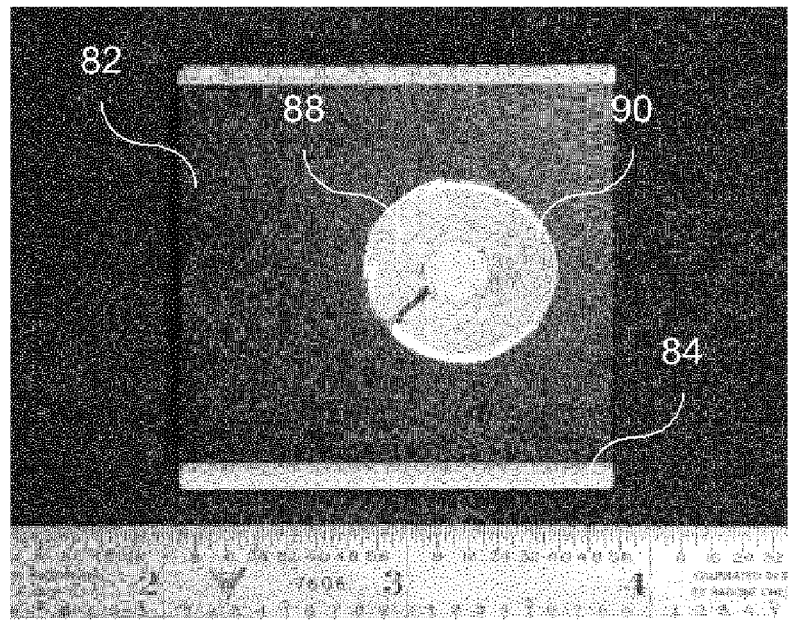
Figure 7C:
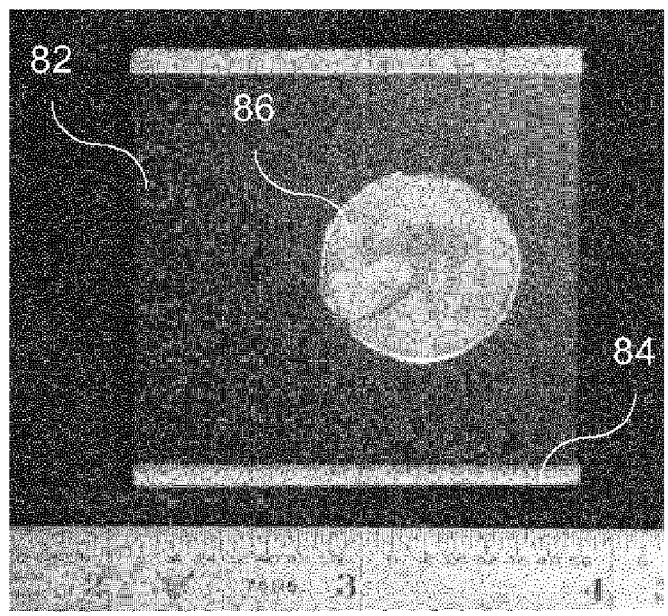
Figure 7D:
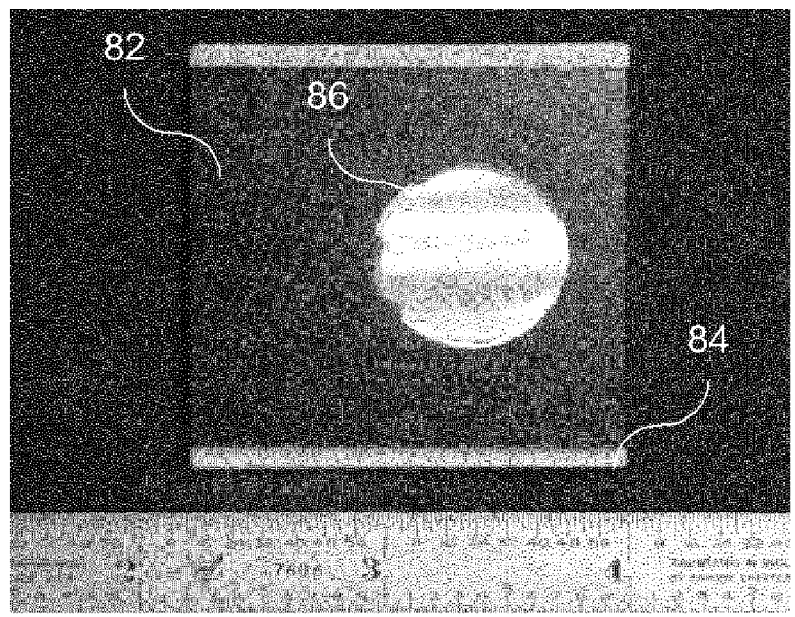

FIGS. 7A through 7D provide actual top down photographs of a composite material 82 placed on metallic substrate 84 wherein an in-situ fastener 86 is built up within the tapered cavity 88. More specifically FIG. 7A shows the composite layer 82 placed on metallic substrate 84 wherein a tapered cavity 88 has been made in the composite layer 82 wherein a portion of the surface of metallic substrate 84 is exposed. The photograph provided in FIG. 7B shows that a protective insert 90, such as a 10 mil aluminum shim, has been placed within the tapered cavity 88. In one example this insert may be bonded using an epoxy to the walls of the shaped cavity 88. This protective insert 90 may reduce or eliminate the erosion of the composite layer 82 exposed to the cold spray deposition. FIG. 7C provides a photograph of a cold spray deposited plug of material that forms a rough in-situ fastener 86. The upper surface of in-situ fastener 86 has then been milled as shown in the phonograph provided in FIG. 7D to provide a flush or continuous surface of the composite material. This eliminates any portion of the in-situ fastener that extends above the surface of composite layer 82.

Figure 8:
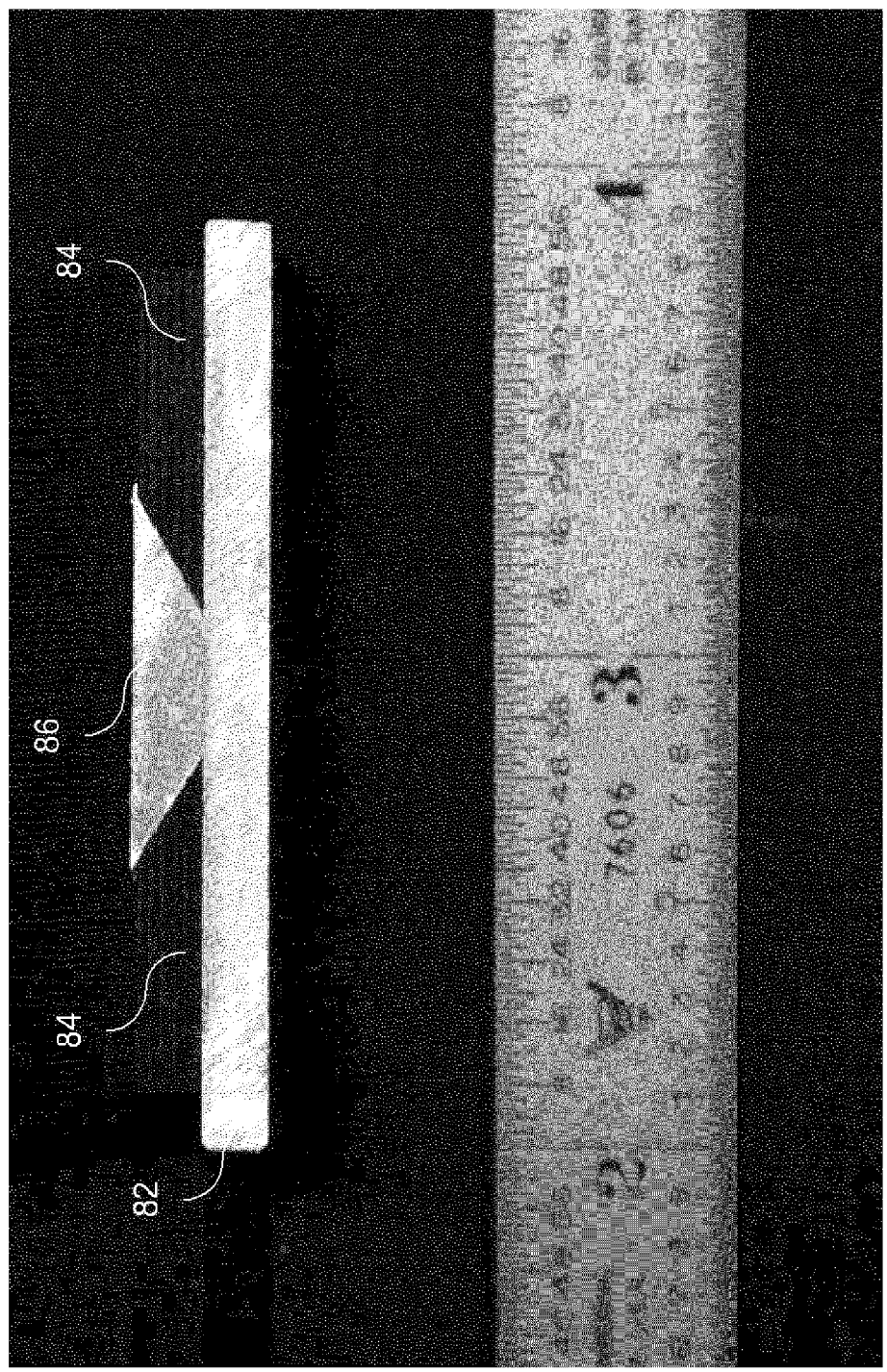
FIG. 8 provides a cross sectional photograph of a in-situ fastener that has been milled and bonded to a metallic substrate which may be used to then secure a metallic substrate to a composite layer in accordance with an embodiment of the present invention.

FIG. 8 provides a cross sectional photograph of a in-situ fastener 86 that has been milled and bonded to a metallic substrate 84 which may be used to then secure metallic substrate 84 to composite layer 82.

Figure 9:
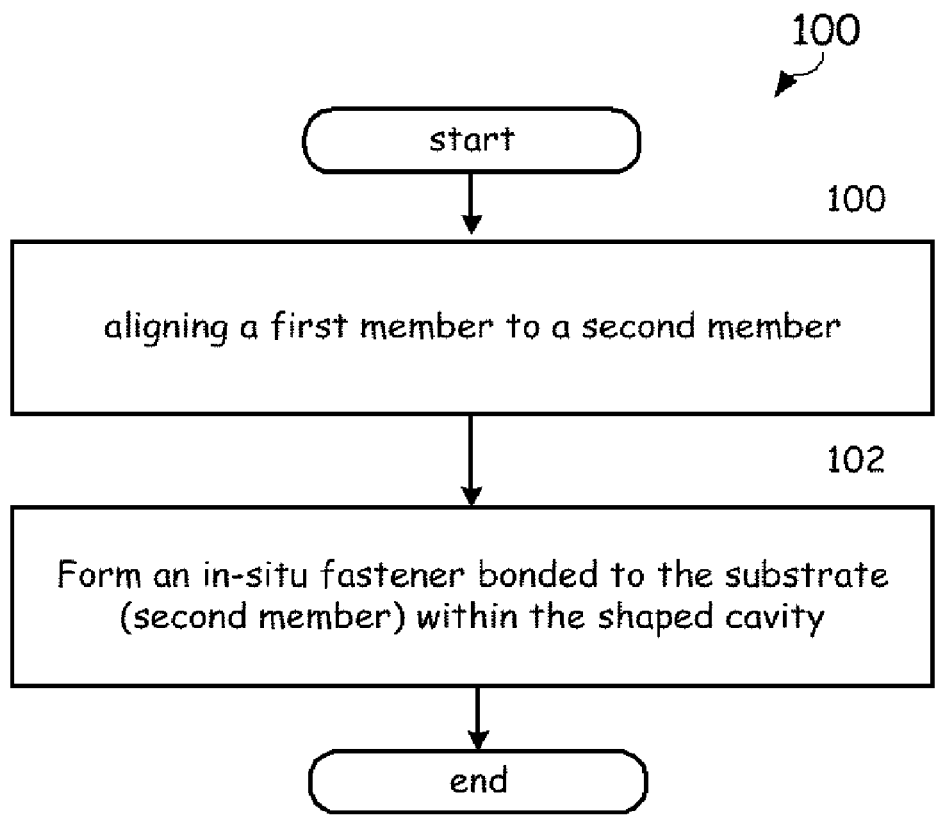
FIG. 9 provides a logic-flow diagram in accordance with an embodiment of the present invention that uses an in-situ fastener to join a first member to a substrate in accordance with an embodiment of the present invention.

FIG. 9 provides a logic-flow diagram in accordance with an embodiment of the present invention that uses an in-situ fastener to join a first member to a substrate. Process 100 begins in Step 102 with the aligning of the first structural member to a second structural member. The first structural member has a number of tapered or shaped holes or cavities. In Step 104 a metallic material may be cold-sprayed into a tapered or shaped cavity to form the in-situ fasteners. Cold-spraying the metallic material forces the metallic material to bond to the portions of the metallic substrate exposed by the tapered or shaped holes. This allows an in-situ tapered fastener to be built up that secures the first structural member to the second structural member or substrate.

Figure 10:
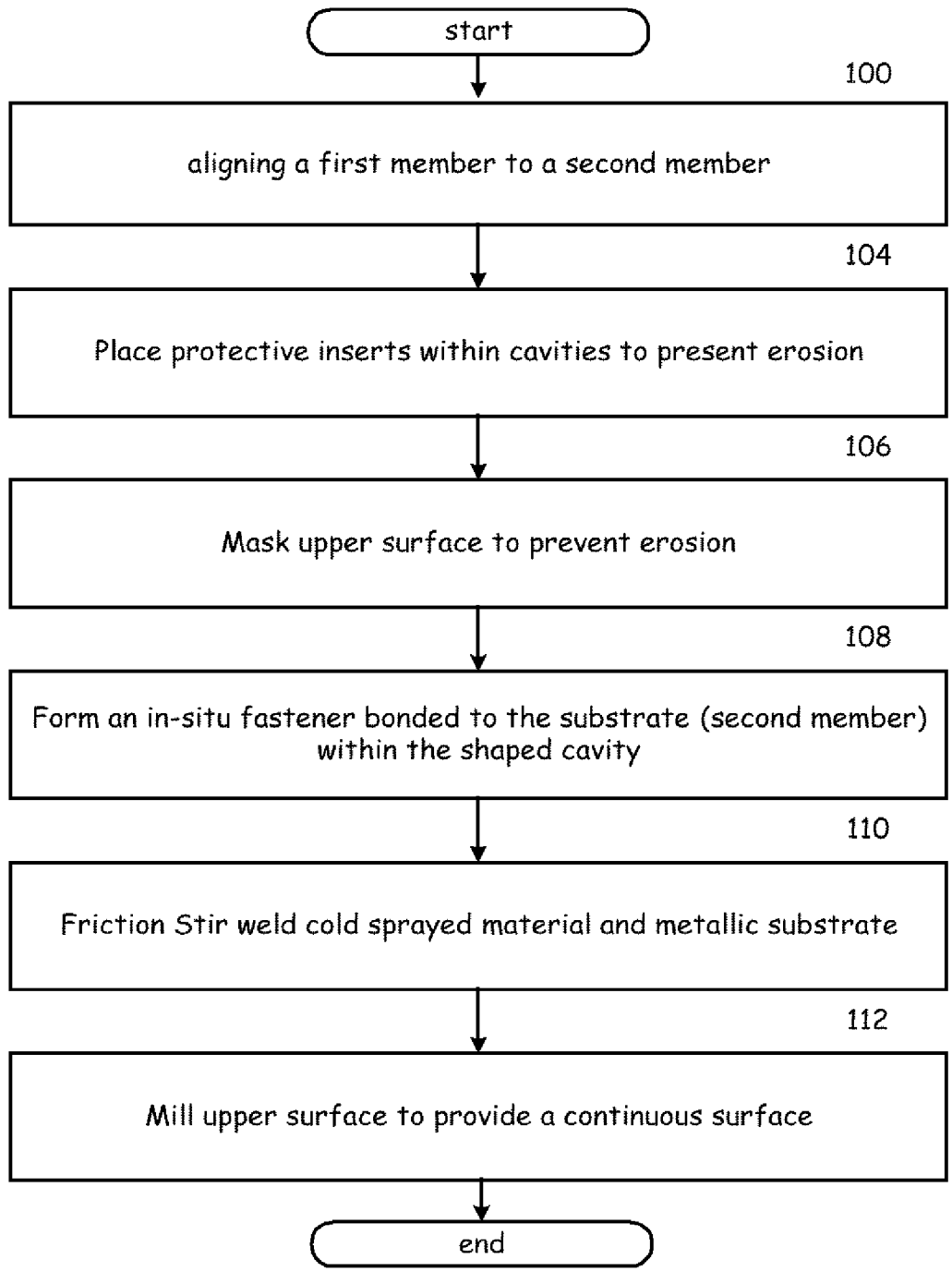
FIG. 10 provides a second logic-flow diagram in accordance with an embodiment of the present invention that uses an in-situ fastener to join a first member to a substrate in accordance with an embodiment of the present invention.

FIG. 10 provides a logic-flow diagram in accordance with an embodiment of the present invention that uses an in-situ fastener to join a first member to a substrate similar to that provided in FIG. 9. However additional steps are provided in FIG. 10. As in FIG. 9 the first structural member is aligned to a metallic substrate in step 102 wherein the first structural member had a number of shaped or tapered cavities. Protective inserts are placed within the shaped or tapered cavities in step 104 in order to protect the first structural member from erosion during the cold-spraying process in Step 108. To further protect the upper surface of the first structural member the exposed surface may be masked in Step 106 to prevent erosion of this upper surface during the cold-spray deposition. As in FIG. 9 a metallic material or other material suitable for cold-spraying is deposited into the shaped cavities to form an in-situ fastener in Step 108. This material again bonds to the metallic substrate and protective inserts. Additionally the cold-spray deposited material and metallic substrate may be friction stir welded in order to provide an improved bond and increase the mechanical properties of the in-situ fastener in Step 110. Unlike prior applications of FSW where two metallic pieces were abutted against each other and friction stir welded to form a single continuous panel. Embodiments of the present invention allow the FSW process to be applied to secure composite and metallic pieces without the need for additional fasteners—thus reducing part count and increasing the mechanical bonds. Additionally, the application of FSW limits any deformation of the vertical portions of the members to be joined. Thus preserving the load bearing capability of the beams.

In Step 112 the upper surface of the in-situ fastener may be milled in order to provide a smooth continuous upper surface of the joined materials.

Embodiments of the present invention provide in-situ tapered flush fasteners which may be used to secure materials such as composite materials to metallic materials. This is achieved without the need drill into the metallic materials. Such an arrangement reduces the setup costs in time and money that are associated with drilling holes, installing fasteners and addressing nonconformance. These setup costs have been determined to be the greatest assembly line cost driver for some advanced aircraft. Further, the issue of hole alignment to fasteners is essentially eliminated. Thus reduce the quality assurance issues associated with nonconformance. By preparing the composite materials off-line, edge distance concerns are greatly reduced.

Furthermore, the Cold Spray processes allow direct metal deposition, cold, in the solid state, in an ambient environment and does not require a protective atmosphere. In-situ fasteners are formed by cold spraying metal powder through a tapered hole machined into the composite and onto the surface of a backing piece of metal. The metal powder particles impact the target surface with sufficient kinetic energy to cause plastic deformation and consolidation with the underlying material to bond together, rapidly building up a layer of deposited material The challenges associated with erosion of the composite material are addressed with the protective inserts and masking layers which reduce or eliminate the erosion of the composite substrate and dependence of the process on alloy selection This invention solves prior problems by using the existing structural members, such as I-beams and C-beams, without requiring alignment guides (i.e. channels, connectors, and/or receptacles) to secure composite materials to these metallic members.

In so doing, the fatigue lives of the structural members are extended through the elimination of localized stresses concentrated by prior fasteners. Stiffness can be better distributed over the entire interface versus 2 or 3 bolts/fasteners interfaces enabling lower overall weight of the structural members and structure. This reduces or eliminates complex tooling requirements. Pull off strength and fatigue life in the finished structure may be improved by the additional application of the FSW process.

In summary, embodiments in the present invention provide a system and method of joining structural members. This method involves aligning the first structural member to a metallic substrate when the first structural member has at least one tapered hole or cavity. A metallic or other like material suitable to cold spraying technology is deposited into the tapered cavity to form a shaped or tapered fastener bonded to the metallic substrate. The shape of the fastener secures the first structural member to the metallic substrate. Additionally, a protective insert may be placed within the shaped or tapered cavity to protect the first structural member during the cold spraying deposition when the first structural member is a composite material or other like material susceptible to erosion during the cold spraying technique. After the material has been deposited using cold spray techniques this material may be further solidified and bonded to the metallic substrate using a technique such as friction stir welding in order to increase the load carrying capacity of the in-situ shaped fastener.

Although the present invention is described in detail, it should be understood that various changes, substitutions and alterations can be made hereto without departing from the spirit and scope of the invention as described by the appended claims.

What is claimed is:

1. A method for joining a first structural member and a substrate, comprising:

aligning a first structural member to a metallic substrate, the first structural member having at least one shaped cavity;

placing a protective insert within the at least one shaped cavity;

masking an exposed surface of the first structural member to prevent erosion of the first structural member during cold spraying;

cold spraying a metallic material into the at least one shaped cavity to form an in-situ tapered fastener, wherein the metallic material bonds to the metallic substrate, and the protective insert protects the first structural member during cold spraying;

wherein the shape of the in-situ tapered fastener secures the first structural member to the metallic substrate; and friction stir welding the in-situ tapered fastener.

2. The method of claim 1, wherein the first structural member comprises a composite material.

3. The method of claim 1, wherein the first structural member includes at least one metallic layer, the at least one metallic layer bonds to the in-situ tapered fastener.

4. The method of claim 1, further comprising milling an upper surface of the in-situ tapered fastener.

5. The method of claim 1, wherein the metallic material comprises aluminum, zinc and aluminum oxide powder.

6. The method of claim 1, wherein the metallic material comprises 60% by weight aluminum, 20% by weight zinc, and 20% by weight aluminum oxide powder.

7. A method for joining a first structural member and a substrate, comprising:

aligning a first structural member to a metallic substrate, the first structural member having at least one shaped cavity;

placing a protective insert within the at least one shaped cavity;

masking an exposed surface of the first structural member to prevent erosion of the first structural member during cold spraying;

cold spraying a metallic material into the at least one shaped cavity to form an in-situ tapered fastener, wherein the metallic material bonds to the metallic substrate, and the protective insert protects the first structural member during cold spraying; and wherein the shape of the in-situ tapered fastener secures the first structural member to the metallic substrate, and the metallic material comprises aluminum, zinc and aluminum oxide powder.

8. The method of claim 7, wherein the first structural member comprises a composite material.

9. The method of claim 7, wherein the first structural member includes at least one metallic layer, the at least one metallic layer bonds to the in-situ tapered fastener.

10. The method of claim 7, further comprising milling an upper surface of the in-situ tapered fastener.

11. The method of claim 7, wherein the metallic material comprises 60% by weight aluminum, 20% by weight zinc, and 20% by weight aluminum oxide powder.

* * * * *

UNITED STATES PATENT AND TRADEMARK OFFICE
CERTIFICATE OF CORRECTION

PATENT NO. : 7,624,910 B2  
APPLICATION NO. : 11/279970  
DATED : December 1, 2009  
INVENTOR(S) : Barnes et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this

Twenty-sixth Day of October, 2010

David J. Kappos
*Director of the United States Patent and Trademark Office*